(12) United States Patent
Kaplan et al.

(10) Patent No.: US 6,278,935 B1
(45) Date of Patent: Aug. 21, 2001

(54) METHOD AND SYSTEM FOR PROVIDING INSTRUCTIONS ABOUT TOLLWAYS WITH A NAVIGATION SYSTEM

(75) Inventors: Lawrence M. Kaplan, Northbrook; Frank J. Kozak, Naperville, both of IL (US)

(73) Assignee: Navigation Technologies Corp., Rosemont, IL (US)

( * ) Notice: Subject to any disclaimer, the term of this patent is extended or adjusted under 35 U.S.C. 154(b) by 0 days.

(21) Appl. No.: 09/360,420

(22) Filed: Jul. 23, 1999

(51) Int. Cl.⁷ ............................. G01C 21/00; G06G 7/78
(52) U.S. Cl. ..................... 701/200; 701/208; 701/209; 701/210; 701/117; 235/384; 705/13; 340/905; 340/928
(58) Field of Search ................................. 701/200, 209, 701/210, 211, 208, 117; 235/384, 380, 375, 462.15, 378; 340/928, 933, 923, 942, 937, 996, 901, 905; 705/13, 412, 417

(56) References Cited

U.S. PATENT DOCUMENTS

| | | | | |
|---|---|---|---|---|
| 5,451,758 | * | 9/1995 | Jesadanont | 235/384 |
| 5,452,212 | * | 9/1995 | Yokoyama et al. | 701/211 |
| 5,452,217 | | 9/1995 | Kishi et al. | 701/207 |
| 5,506,774 | | 4/1996 | Nobe et al. | 701/213 |
| 5,537,324 | | 7/1996 | Nimura et al. | 701/208 |
| 5,684,704 | | 11/1997 | Okazaki | 701/208 |
| 5,689,423 | | 11/1997 | Sawada | 701/208 |
| 5,694,322 | | 12/1997 | Westerlage et al. | 705/417 |
| 5,710,566 | | 1/1998 | Grabow et al. | 340/928 |
| 5,710,702 | | 1/1998 | Hayashi et al. | 701/1 |
| 5,717,389 | * | 2/1998 | Mertens et al. | 340/928 |
| 5,721,678 | | 2/1998 | Widl | 701/213 |
| 5,760,709 | | 6/1998 | Hayashi | 340/923 |
| 5,844,505 | * | 12/1998 | Van Ryzin | 340/988 |
| 5,962,833 | * | 10/1999 | Hayashi | 235/384 |
| 5,968,109 | * | 10/1999 | Israni et al. | 701/208 |
| 6,042,008 | * | 3/2000 | Ando et al. | 235/384 |
| 6,084,543 | * | 7/2000 | Iizuka | 342/357.13 |
| 6,119,066 | * | 9/2000 | Sugiura et al. | 701/208 |

* cited by examiner

*Primary Examiner*—Jacques H. Louis-Jacques
(74) *Attorney, Agent, or Firm*—Frank J. Kozak; Lawrence M. Kaplan

(57) ABSTRACT

A navigation system provides a user thereof with warnings or advisories about toll gates that require exact change. The warnings or advisories are provided when the navigation system calculates a solution route to a destination specified by the user. The warnings or advisories are also provided when the user queries the navigation system about a particular specified portion of a road. The navigation system uses a geographic database that includes data about roads in a geographic region. The geographic database includes data about toll gates located along portions of roads including data about whether a toll gate along a portion or a road requires exact change.

26 Claims, 11 Drawing Sheets

FIG. 4

GEOGRAPHIC DATA 140

ROAD SEGMENT RECORD 258

- SEG ID 258(1)
- RESTRICTED DIRECTION 258(2)
- SPEED LIMIT 258(3)
- other data 258(5)
- CLASSIFICATION (e.g. controlled access, ramp . . . etc.) 258(4)

TOLL GATE DATA 258(6)
- LOCATION 258(6)(1)
- AMOUNT 258(6)(2)
- EXACT CHANGE 258(6)(3)
- ELECTRONIC 258(6)(5)
- ATTENDED 258(6)(4)
- other 258(6)(6)

ENDPOINTS 258(7)
- (left endpoint) NODE ID 258(7)(1)(1)
- (right endpoint) NODE ID 258(7)(2)(1)

NODE DATA ENTITY 260(1)
- COORDINATES 260(1)(1)
  - LATITUDE
  - LONGITUDE
- other data 260(1)(4)

NODE DATA ENTITY 260(2)
- COORDINATES 260(2)(1)
  - LATITUDE
  - LONGITUDE
- other data 260(2)(4)

FIG. 7

GEOGRAPHIC DATA 140

:

NODE DATA ENTITY 260(3)

COORDINATES 260(3)(1)
- LATITUDE
- LONGITUDE

TOLL GATE DATA 260(3)(5)
- AMOUNT 260(3)(5)(2)
- EXACT CHANGE 260(3)(5)(3)
- ATTENDED 260(3)(5)(4)
- ELECTRONIC 260(3)(5)(5)
- other 260(3)(5)(6)

other data 260(1)(4)

:

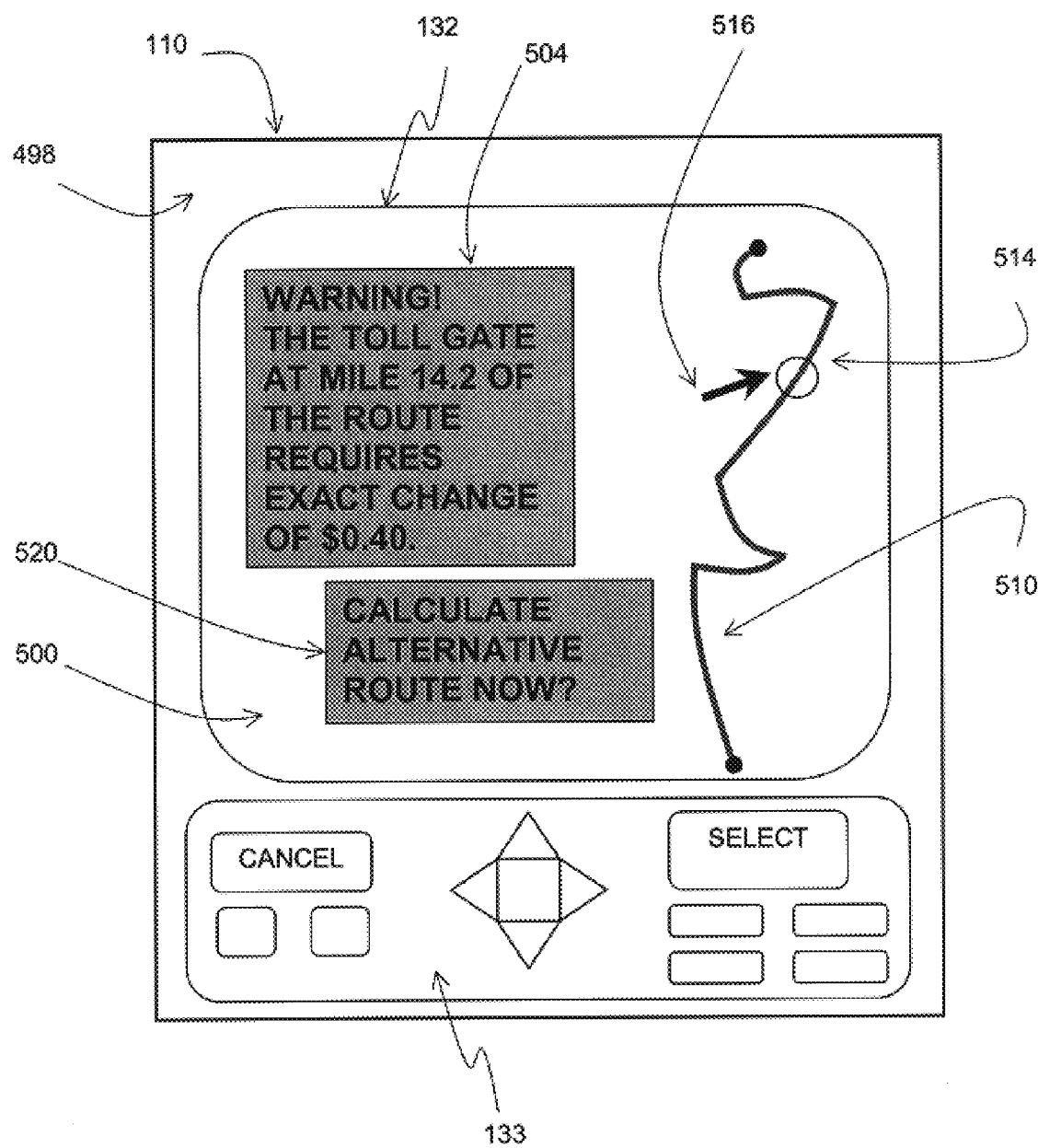

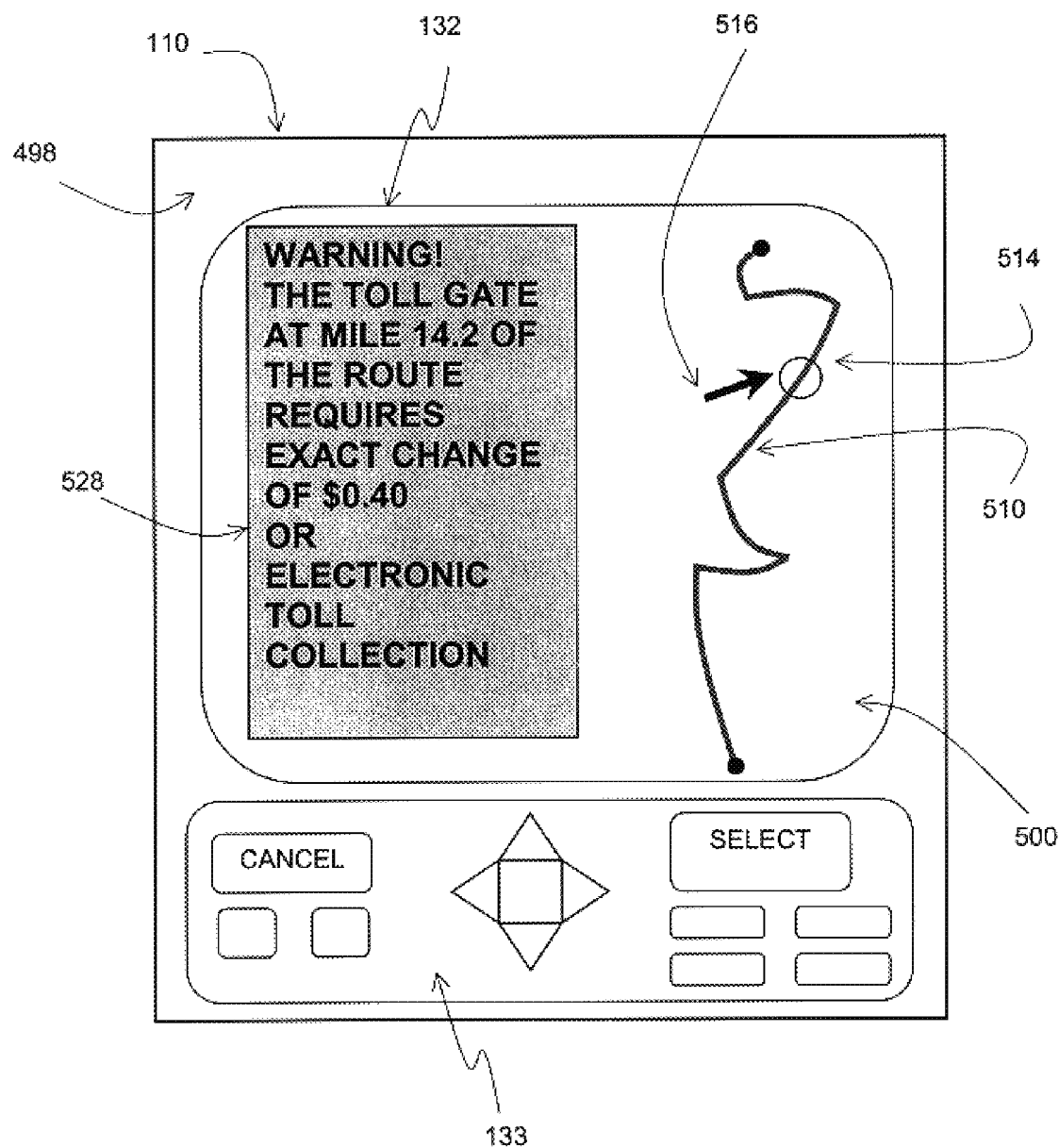

METHOD AND SYSTEM FOR PROVIDING INSTRUCTIONS ABOUT TOLLWAYS WITH A NAVIGATION SYSTEM

BACKGROUND OF THE INVENTION

The present invention relates to in-vehicle navigation systems and more particularly, the present invention relates to features provided by in-vehicle navigation systems relating to tollway information.

In-vehicle navigation systems are available that provide end users (such as drivers of the vehicles in which the in-vehicle navigation systems are installed) with various navigating functions and features. For example, some in-vehicle navigation systems are able to determine an optimum route to travel by roads between locations in a geographic region. Using input from the end user, and optionally from equipment that can determine one's physical location (such as a GPS system), a navigation system can examine various routes between two or more locations to determine an optimum route to travel from a starting location to a destination location in a geographic region. The navigation system may then provide the end user with information about the optimum route in the form of instructions that identify the driving maneuvers required to be taken by the end user to travel from the starting location to the destination location. The instructions may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for improvements. One area in which there is room for improvement relates to providing instructions about tollways. Although some prior navigation systems may provide instructions about tollways, these prior systems have not provided instructions about exact change requirements, whether a toll booth or gate along a tollway was manned, whether electronic fare collection was available, etc. Accordingly, when using such prior navigation systems, the end user may not be prepared to make the appropriate payment at toll gates encountered while driving.

Accordingly, there exists a need for navigation systems to provide information relating to toll collection requirements

SUMMARY OF THE INVENTION

To address these and other objectives, the present invention comprises a navigation system that provides a user thereof with warning messages or advisories about toll gates that require exact change. The warning messages or advisories are provided when the navigation system calculates a solution route to a destination specified by the user. The warning messages or advisories are also provided when the user queries the navigation system about a particular specified portion of a road. The navigation system uses a geographic database that includes data about roads in a geographic region. The geographic database includes data about toll gates located along portions of roads, including data about whether a toll gate along a portion or a road requires exact change.

BRIEF DESCRIPTION OF THE DRAWINGS

FIG. 4 shows components of data records included in the geographic database shown in FIGS. 1 and 2.

FIG. 7 shows some of the components of a node data record that includes toll gate data represented in accordance with the method described in connection with FIG. 6.

FIG. 11 is an illustration of the navigation system of FIG. 1 showing an image on the display screen relating to an exact change warning message and a message about a request to calculate an alternative route.

FIG. 12 is an illustration of the navigation system of FIG. 1 showing an image on the display screen relating to an exact change warning message and a message about electronic toll collection.

DETAILED DESCRIPTION OF THE PRESENTLY PREFERRED EMBODIMENTS

I. Navigation System—Overview

Figure 1:
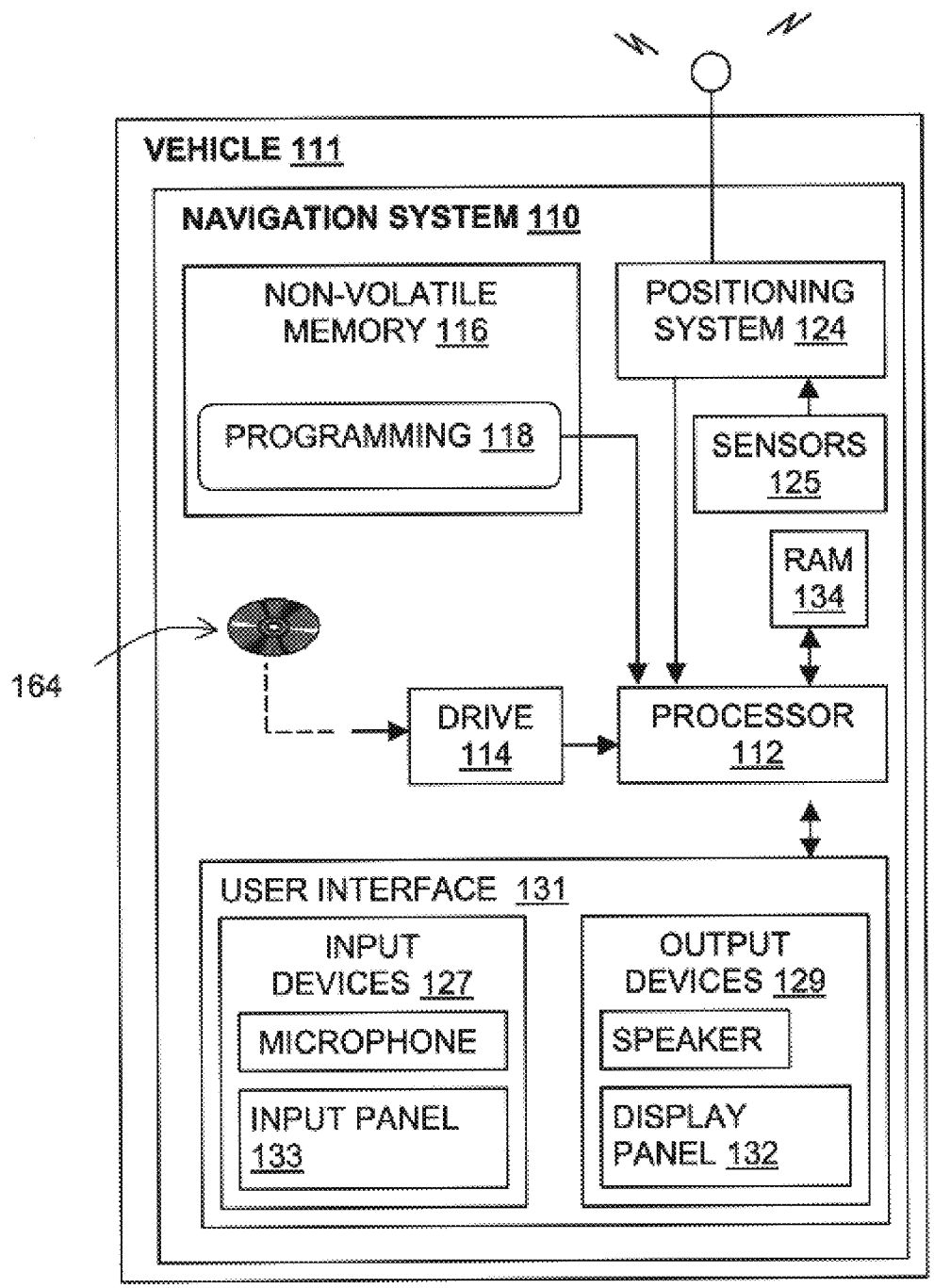
FIG. 1 is a block diagram illustrating a navigation system.

Referring to FIG. 1, there is a block diagram of a navigation system 110. The navigation system 110 is installed in a vehicle 111, such as a car, bus, or truck, although in alternative embodiments, the navigation system 110 may be located outside of a vehicle or may be implemented in various other platforms or environments, as described below. The navigation system 110 is a combination of hardware and software components. In one embodiment, the navigation system 110 includes a processor 112, a drive 114 connected to the processor 112, and a non-volatile memory storage device 116 for storing programming 118 and possibly other information. The processor 112 may be of any type used in navigation systems. Processors that are developed in the future may also be suitable.

The navigation system 110 may also include a positioning system 124. The positioning system 24 may utilize GPS-type technology, a dead reckoning-type system, or combinations of these or other systems, all of which are known in the art. The positioning system 124 may include suitable sensing devices 125 that measure the traveling distance, speed, direction, and so on, of the vehicle. The positioning system 124 may also include appropriate technology to obtain a GPS signal in a manner which is known in the art. The positioning system 124 provides an output to the processor 112. The output from the positioning system 124 is used by the software 118 that is run on the processor 112 to determine the location, direction, speed, etc., of the navigation system 110.

The navigation system 110 also includes a user interface 131. The user interface 131 includes appropriate equipment that allows the end user to input information into the navigation system. This input information may include a request to use the navigation features of the navigation system. For example, the input information may include a request for a route to a desired destination. The input information may also include other kinds of information. The equipment used to input information into the navigation system may include an input panel 133, such as a keypad, a keyboard, buttons, switches, etc., or a microphone, etc., as well as appropriate software, such as voice recognition programming. The user interface 131 also includes suitable equipment that provides information back to the end user. This equipment may include a display 132, speakers, or other means.

Figure 2:
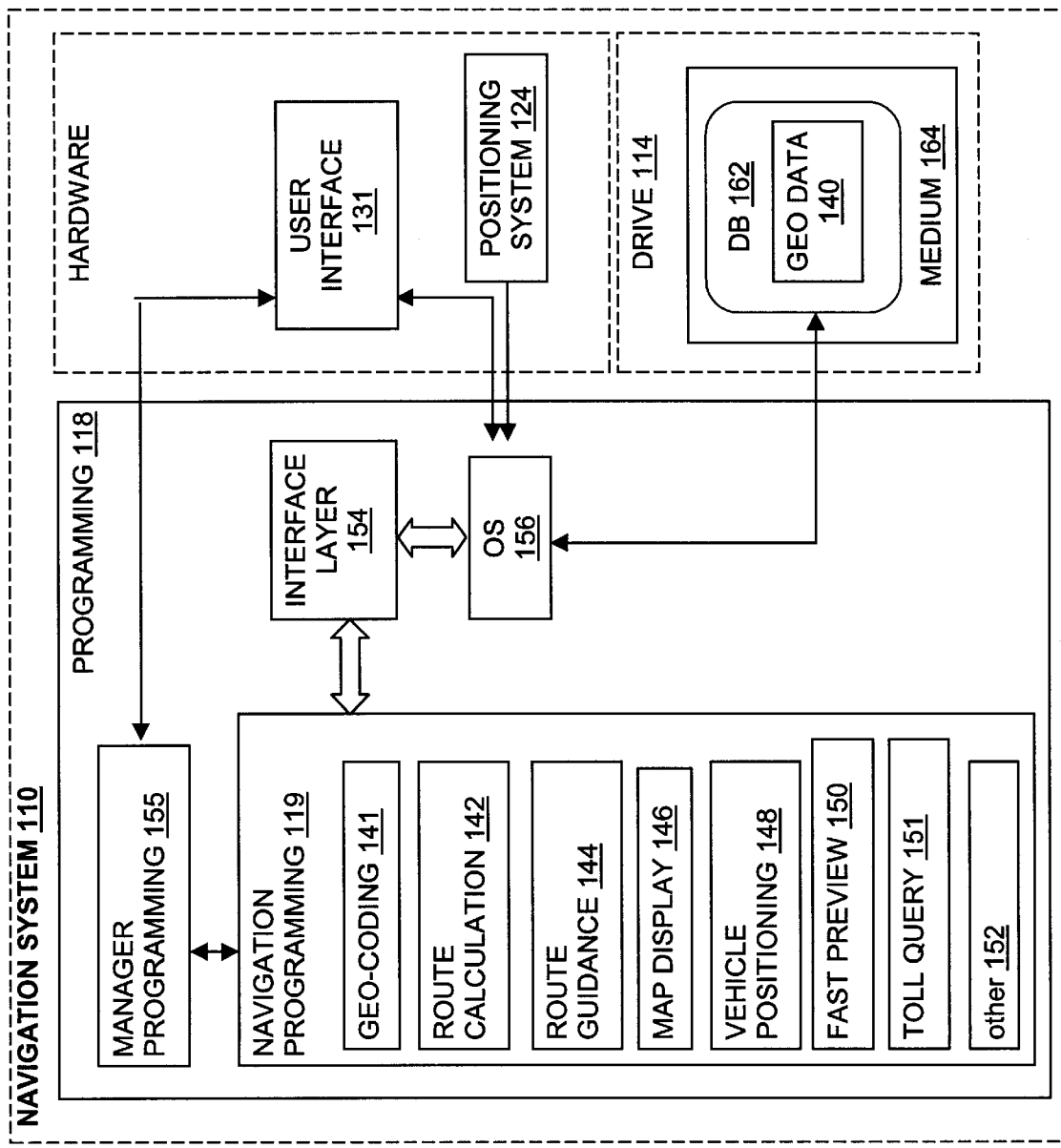
FIG. 2 is a block diagram showing more detail of some of the software components of the navigation system shown in FIG. 1.

Referring to FIGS. 1 and 2, the programming 118 may be loaded from the non-volatile memory 116 into a RAM 134 associated with the processor 112 in order to operate the navigation system. The programming 118 includes navigation-related application software 119 that provides for the navigating functions and features of the navigation system 110. The navigation-related application software 119 uses geographic data 140, possibly in conjunction with the output from the positioning system 124, to provide various navigation features and functions. The navigation-related application software 119 may include separate component applications (also referred to as programs, subprograms, routines, or tools) that provide these various navigation-related features and functions.

FIG. 2 shows some of the component applications for one embodiment of the navigation-related software 119 included in the navigation system 110 of FIG. 1. These component applications may include geo-coding 141 (wherein geographic coordinates from the positioning system 124 are related to data representing features represented in the geographic data 140), route calculation 142, route guidance 144 (wherein detailed directions are provided for reaching a desired destination), map display 146, vehicle positioning 148 (wherein a vehicle position is related to the geographic data 140), route preview 150 (wherein the end user is provided with an outline or highlights of the calculated route), a toll query function 151, and other functions 152. Other component applications, programs or tools may be included in the navigation programming 118.

The component applications of the programming 118 may work together through defined programming interfaces. The navigation-related application software 119 may access the geographic data 140 directly, or alternatively, the navigation application software 119 accesses the geographic data 140 through an interface layer 154 and operating system 156. The interface layer 154 and operating system 156 may be part of the programming 118 or may be provided separately.

In addition to the navigation-related applications 119, the programming 118 may also include manager application software 155. The manager application software 155 provide interfaces to the hardware in the user interface 131 and the positioning system 124. The manager application software 155 may also coordinate requests for data from the navigation-related applications 119.

In one embodiment, the separate applications of the programming 118 are written in the C programming language although in alternative embodiments other programming languages may be used, such as C++, Java, Visual Basic, and so on.

II. The Geographic Map Database

A. Overview

Referring to FIG. 2, the geographic data 140 is organized into one or more databases 162 and stored on a storage medium 164. The storage medium 164 is installed in the drive 114 so that the geographic data 140 can be read and used by the navigation system. The storage medium 164 may be removable and replaceable so that a storage medium with an appropriate database 162 for the geographic region in which the vehicle is traveling can be used. In addition, the storage medium 164 may be replaceable so that geographic data 140 on it can be updated easily.

In one embodiment, the geographic data are provided by Navigation Technologies Corporation of Rosemont, Illinois. However it is understood that the inventive concepts disclosed herein are not restricted to any particular source of data.

In one embodiment, the storage medium 164 is a CD-ROM disk. In an alternative embodiment, the storage medium 164 may be a PCMCIA card in which case the drive 114 would be replaced with a PCMCIA slot. Various other storage media may be used, including fixed or hard disks, DVD disks or other currently available storage media, as well as storage media that may be developed in the future. The storage medium 164 and the geographic data 140 do not have to be physically provided at the location of the navigation system. In alternative embodiments, the storage medium 164, upon which some or all of the geographic data 140 are stored, may be located remotely from the rest of the navigation system and portions of the geographic data provided via a communications link, as needed.

The map database 162 contains information about the roadway network in the geographic region. In one embodiment, the map database 162 includes node data and segment data. These data represent components of the physical road network. Node data represent physical locations in the geographic region (such as roadway intersections and other positions) and segment data represent portions of roadways between the physical locations represented by nodes. (The terms "nodes" and "segments" represent only one terminology for describing these physical geographic features and other terminology for describing these features is intended to be encompassed within the scope of these concepts.) The information included in the node and segment data entities is explained with reference to FIGS. 3–7.

Figure 3:
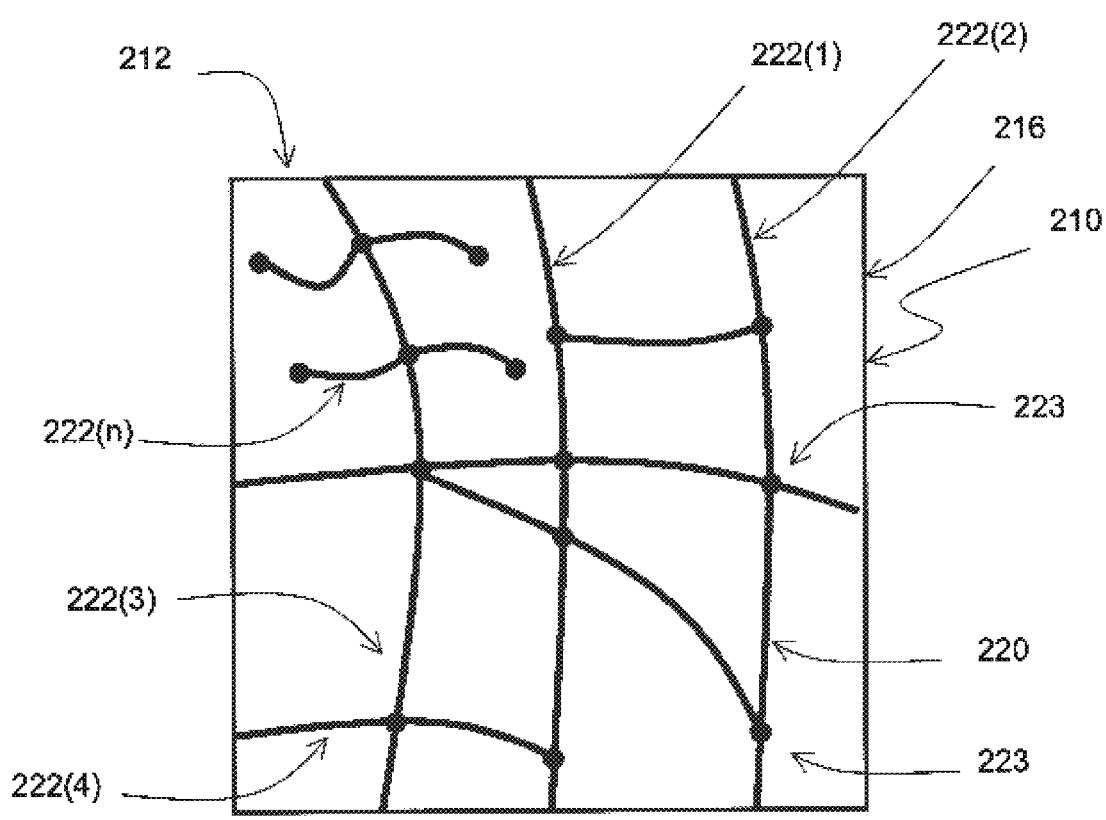
FIG. 3 illustrates a map showing a portion of the geographic region represented by the geographic database of FIGS. 1 and 2.

FIG. 3 shows a map 216 of a portion of a geographic region 212 represented by the geographic database 162 in FIG. 2. The map 216 in FIG. 3 illustrates part of the road network 220 in the geographic region 212. The road network 220 includes, among other things, roads and intersections located in the geographic region 212. As shown in FIG. 3, each road in the geographic region 212 is composed of one or more segments, 222(1), 222(2) . . . 222(n). In one embodiment, a road segment represents a portion of the road. In FIG. 3, each road segment 222 is shown to have associated with it two nodes 223: one node represents the point at one end of the road segment and the other node represents the point at the other end of the road segment. The node at either end of a road segment may correspond to a location at which the road meets another road, e.g., an intersection, or where the road dead ends.

In the geographic database 162, there is at least one database entry (also referred to as "entity" or "record") for each road segment represented in a geographic region. In the geographic database 162 that represents the geographic region 212, there may also be a database entry (entity or record) for each represented node in the geographic region. FIG. 4 shows some of the components of these two kinds of data records that are included in the geographic database 162 of FIG. 2.

Referring to FIG. 4, some of the components of a road segment data record 258 and two node data records 260(1) and 260(2) are shown. Each road segment data record and node data record may have associated with it information (such as "attributes", "fields", etc.) that describe features of the represented road segment or node. The road segment record 258 includes a segment ID 258(1) by which the data record can be identified in the geographic database 162. The road segment data record 258 may also include data 258(2) that indicates the restrictions, if any, on the direction of vehicular travel permitted on the represented road segment. The road segment data record 258 includes data 258(3) that indicates a speed limit or speed category (i.e., the maximum permitted vehicular speed of travel on the represented road segment). The road segment data record 258 may also include data 258(4) indicating whether the represented road segment is part of a controlled access road (such as an expressway), a ramp to a controlled access road, a bridge, a tunnel, a toll road, a ferry, and so on.

The road segment data record 258 also includes data 258(7) providing the geographic coordinates (e.g., the latitude and longitude) of the endpoints of the road segment. In one embodiment, this data 258(7) is a reference to the node data records 260(1) and 260(2) that represent the nodes corresponding to the endpoints of the represented road segment.

The road segment record 258 may also include or be associated with other data 258(5) that refer to various other attributes of the represented road segment. The various attributes associated with a road segment may be included in a single road segment record, or may be included in more than one type of record which are cross-referenced to each other. For example, the road segment data record may include data identifying what turn restrictions exist at each of the nodes which correspond to intersections at the ends of the road portion represented by the road segment, the name or names by which the represented road segment is known, the street address ranges along the represented road segment, and so on. The various attributes associated with a road segment may be included in a single road segment record, or preferably are included in more than one type of road segment record which are cross-referenced to each other.

Each of the node data records 260 may have associated information (such as "attributes", "fields", etc.) that allows identification of the road segment(s) that connect to it and/or its geographic position (e.g., its latitude and longitude coordinates).

In a present embodiment, the geographic data 140 include data relating to tollways. The data relating to tollways may include some or all of the following: an identification of the road segments that form part of a tollway, the locations of toll gates, an indication whether a toll gate requires exact change, an indication whether a toll gate is manned, and an indication whether a toll gate accepts payment of a toll by electronic means. (For purposes of this disclosure, the term "toll gate" is used to refer to any location along a road at which a toll is collected for travel along the road. A "toll gate" does not require an actual physical gate or barrier. A toll gate may be part of a toll plaza that includes a plurality of individual toll gates.)

Figure 5:
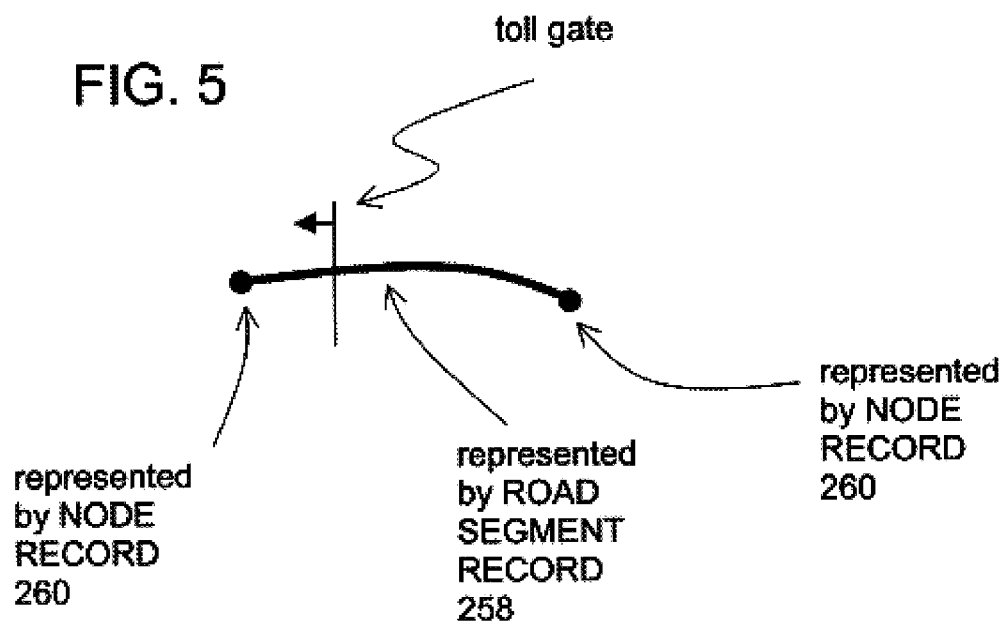
FIG. 5 is a drawing of a toll gate that illustrates one way that toll gate data can be represented in the geographic database of FIGS. 1 and 2.

Toll gates (i.e., locations at which tolls are paid) may be represented in the geographic database 162 in various different ways. One way that a toll gate can be represented in the geographic database is explained in connection with FIGS. 4 and 5. FIG. 5 is an illustration of a toll gate located along a road segment. According to this embodiment, a toll gate is represented as a feature of a represented road segment. The road segment illustrated in FIG. 5 is represented by a road segment data record 258 like the one shown in FIG. 4. Data about the toll gate located along the road segment is associated with the data record representing the road segment.

Referring to FIG. 4, the road segment data record 258 includes toll gate data 258(6). As shown in FIG. 4, the toll gate data 258(6) includes data 258(6)(1) indicating the location of the toll gate along the represented road segment, data 258(6)(2) indicating the amount of the toll required at the toll gate, data 258(6)(3) indicating whether the toll gate requires exact change, data 258(6)(4) indicating whether the toll gate has an attendant on duty for taking tolls and making change, data 258(6)(5) indicating whether the toll gate accepts payment of tolls by electronic means, and possibly other data 258(6)(6). The data 258(6)(1) indicating the location of the toll gate along the represented road segment may be provided as absolute geographic coordinates of the toll gate, or alternatively, the location of the toll gate may be provided relative to one or the other of the endpoints of the represented road segment along which the toll gate is located. For example, the location of the toll gate may be defined as 30 meters from the left endpoint of the road segment. Alternatively, the location of the toll gate may be defined in fractional portions of the length of the associated road segment, e.g., ⅜ of the length of the segment from the left end point.

Figure 6:
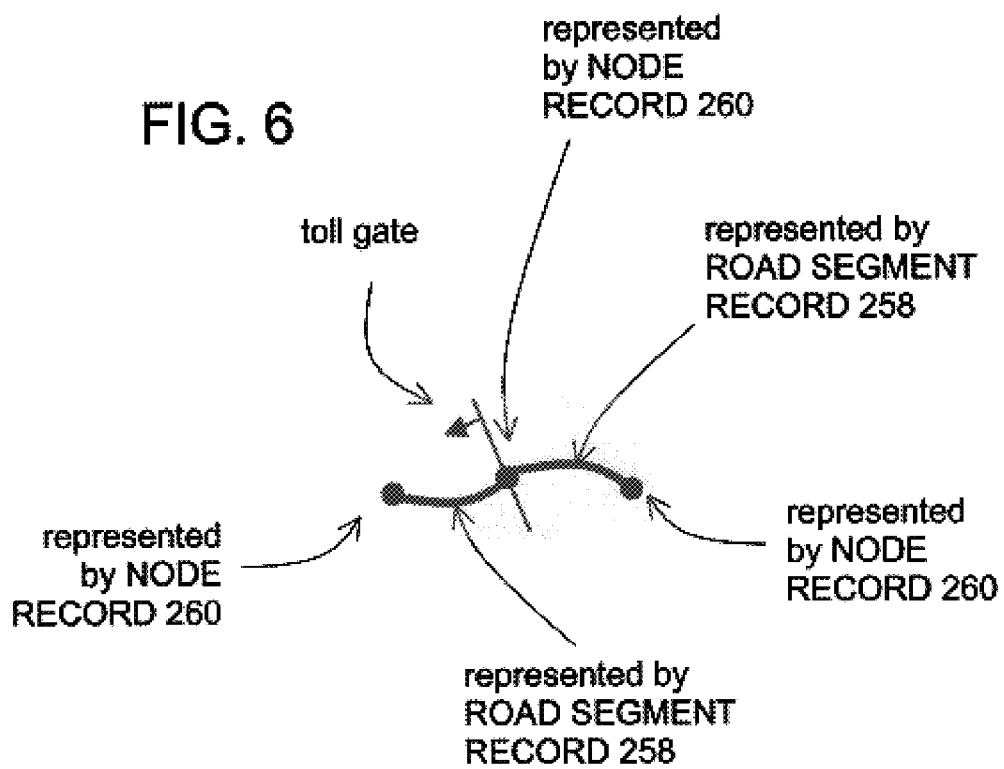
FIG. 6 is a drawing of a toll gate that illustrates another way that toll gate data can be represented in the geographic database of FIGS. 1 and 2.

Another way that the geographic database 162 can represent a toll gate is illustrated in connection with FIG. 6. In FIG. 6, the road segments leading into and away from the toll gate are represented in the geographic database by separate road segment data records. Thus, the toll gate illustrated in FIG. 6 corresponds to the position of the node linking the two road segments. Toll gate data can be associated with the node data record that represents the node linking the two road segments. Some of the components of a node data record 260(3) located at the position of a toll gate are illustrated in FIG. 7. The components of the node data record 260(3) in FIG. 7 are similar to the components of the node data records 260(1) and 260(2) shown in FIG. 4, except that the node data record 260(3) includes toll gate data 260(3)(5). The toll gate data 260(3)(5) associated with the node data record 260(3) includes some of the same kinds of data as the toll gate data 258(5) associated with a road segment data record shown in FIG. 4. As shown in FIG. 7, the toll gate data 260(3)(5) associated with the node data record 260(3) includes data 260(3)(5)(2) indicating the amount of the toll required at the toll gate, data 260(3)(5)(3) indicating whether the toll gate requires exact change, data 260(3)(5)(4) indicating whether the toll gate has an attendant on duty for taking tolls and making change, data 260(3)(5)(5) indicating whether the toll gate accepts payment of tolls by electronic means, and possibly other data 260(3)(5)(6).

The toll gate data 260(3)(5) shown in FIG. 7 does not require that the location of the toll gate be separately specified because the location of the node 260(3)(1) can be taken as the location of the toll gate.

In the geographic database 162, toll gate data may be stored according to the way described in connection with FIGS. 4 and 5 (as a feature of a road segment) or according to the way described in connection FIGS. 6 and 7 (as a feature of a node). Alternatively, the geographic database 162 can store toll gate data both ways in the same database. Other alternative ways to represent toll gates can also be used. For example, toll gates can be stored as separate data entities.

B. The Route Calculation Application

As stated above in connection with FIG. 2, the route calculation functions of the navigation system 110 are performed by the route calculation application 142. According to one embodiment, a manager application 155 provides a request to the route calculation application 142 to calculate a route. The request by the manager application 155 specifies at least an origin and a destination. The request by the manager application 155 to the route calculation application 142 may include additional information, such as desired intermediate stops, driver preferences, a start time, etc.

In one embodiment, the request to calculate a route may originate with the end user. The end user may indicate a desired destination using the user interface 131. Unless the end user also identifies an origin using the user interface 131, the current vehicle position may be taken as the origin.

In one embodiment, the origin and destination are specified to the route calculation function 142 relative to data in the geographic database. For example, the origin and destination may be specified at or along a road segment represented by an identified road segment data record. The manager application 155 may obtain from the vehicle positioning application 148 an identification of the road segment data record that represents the road segment upon which the vehicle is currently located. The manager application 155 may obtain from the geo-coding application 141 an identification of the road segment data record that represents the road segment upon which the desired destination indicated by the end user is located. (If the end user also specifies a desired origin, the manager application 155 may obtain an identification of the road segment data record that represents the road segment upon which the desired origin is located from the geo-coding application 141.) Thus, according to this embodiment, when the manager application 155 requests the route calculation application 142 to calculate a route between a specified origin and destination, it first obtains data from the geo-coding application 141 and possibly the vehicle positioning application 148 that relates the origin and destination to data in the geographic database 162. In an alternative embodiment, the functions of relating the end user specified destination and origin or the vehicle position may be performed by other routines including routines in the route calculation application 142.

Given data that identify the positions of an origin and destination, the route calculation application 142 calculates a route between the origin and the destination. The route calculation application 142 may use any of various means or algorithms for this purpose. Methods for calculating routes are disclosed in Ser. No. 09/047,698, filed Mar. 25, 1998, the entire disclosure of which is incorporated by reference herein. For example, the method used may include either the A* algorithm or the Dykstra algorithm. (The methods disclosed in the aforementioned patent application represent only some of the ways that routes can be calculated and the claimed subject matter herein is not limited to any particular method of route calculation. Any suitable route calculation method now known or developed in the future may be employed.)

Regardless of the method used, the objective of the route calculation application 142 is to develop a list identifying a continuous series of road segments that form a legally valid solution route between the origin and destination. (A "legally valid solution route" conforms to known traffic restrictions, such as one way streets, turn restrictions, etc.) The method used by the route calculation application 142 may be designed to optimize the solution route to meet one or more predetermined criteria. Such criteria may include the least travel time, the shortest distance, the fewest turns, etc. If the method used by the route calculation application 142 is designed to find a solution route that is optimized for one or more criteria, then the solution route also ideally meets these one or more criteria.

When using any of the aforementioned methods for calculating a solution route, the route calculation application 142 may explore several different alternative potential paths leading from the origin for inclusion in the solution route. The route calculation application 142 may also explore several different alternative potential paths leading back from the destination for inclusion in the solution route. Also, the route calculation application 142 may explore several different alternative potential paths leading from all or some of the intersections along potential portions of a solution route. For example, additional alternative paths may be identified and explored whenever an intersection having more than one valid successor road segment is encountered along an existing alternative potential solution path being explored. The number of different alternative potential solution paths can increase rapidly. According to some route calculation methods, as route calculation proceeds some alternative potential solution paths being explored may be discarded based upon comparisons to other more promising alternative potential solution paths. According to some route calculation methods, as route calculation proceeds, further exploration of some alternative paths being explored may be suspended or deferred in favor of other, more promising, alternative potential solution paths.

As the route calculation application 142 evaluates different alternative potential solution paths for inclusion in the solution route, it stores data identifying the road segments included in each alternative potential solution path. According to one present embodiment, database ID's (e.g., segment ID 258(1) in FIG. 4) that identify the road segment data records that represent the road segments included in each different alternative path are stored. The route calculation application 142 may also store additional data relating to each of the alternative potential solution paths, such as the total distance of all the road segments included in each alternative potential solution path, the total time of travel for each alternative potential solution path, and so on.

Figure 8:
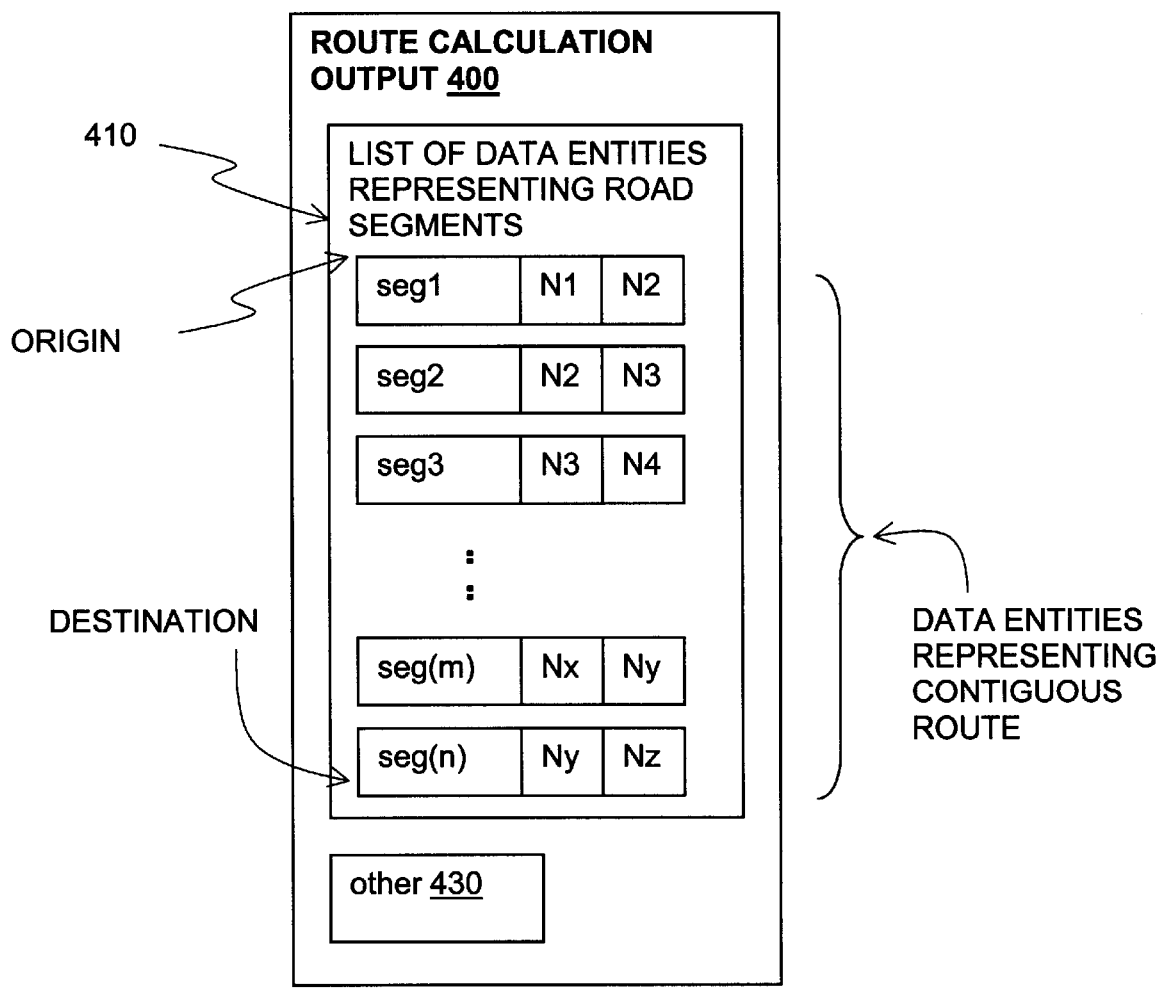
FIG. 8 is a block diagram showing some of the components of the output of the route calculation function shown in FIG. 2.

After the route calculation application 142 has found a solution route, an output is provided to the route guidance application 144. FIG. 8 is a diagram representing the components of an output 400 of the route calculation application 142. The route calculation output 400 contains an ordered list 410 identifying a plurality of road segment data entities 258. The plurality of road segment data entities 258 in the output 400 of the route calculation application 142 are labeled, seg1, seg2, seg3 . . . seg(n). The plurality of data entities 258 represent the road segments that form the continuous navigable route between the origin and the destination that has been calculated by the route calculation application 142. Since these road segments form a continuous route, each segment shares a node with its successor segment represented in the list 410. For example, as shown in FIG. 8, the segments "seg2" and "seg3" are shown to have a common node "N3."

As mentioned above, the route calculation output 400 may include other information 430 in addition to the ordered list of road segment data entities.

In a present embodiment, the list 410 of data entities representing road segments included in the output 400 created by the route calculation application 142 is used as an input to the route guidance application 144. The route guidance application 144 uses the data in the list 410 of data entities representing road segments, in conjunction with additional information from the geographic database 162, to return navigation information to the manager application 155. The data returned by the route guidance application 144 to the manager application 155 may be sent directly to the user interface 131 for presentation to the end user. Alternatively, the data returned by the route guidance application 144 to the manager application 155 may be further processed by programming in the manager application 155. The presentation of route guidance information to the end user via the user interface 131 may be in the form of audible instructions, visual textual instructions, visual graphical instructions, or any combinations of these or other types of information presentation.

According to a present embodiment, the data entities identified by the list 410 in the route calculation output 400, which is created by the route calculation application 142, can be examined for data relating to toll gates. More specifically, the toll gate data (e.g., 258(6)) in the road segment data entities 258 in the list 410 or the toll gate data (e.g., 260(3)(5)) in the node data entities that represent the nodes linking the roads in the list 410 can be examined to provide warning messages and advisory features, as described below. The examination of the toll gate data can be performed by the toll query function 151. Alternatively, the examination of the toll gate data can be performed by a routine in the manager application 155 or by routine elsewhere in the programming 118.

III. Toll Warning Embodiments

A. First Embodiment

According to a first embodiment, the end user uses the navigation system 110 to calculate a route. As described above, there are various means and algorithms by which the navigation system can calculate a route. After the navigation system has calculated a solution route for the end user, a function (such as the toll query function 151) in the navigation system software 118 determines whether any portion of the solution route includes a toll gate at which exact change is required. This information can be determined using the data (258(6)(3) in FIG. 4 or 260(3)(5)(3) in FIG. 7) in the data included in the route calculation output 400. If the solution route includes a toll gate at which exact change is required, a warning message is provided by the navigation system to the end user. The warning message may be provided via the user interface. The warning message may be audible or visual. In one embodiment, the warning message is a visual warning message accompanied by an audible warning. The warning message presents the end user with information that indicates that the solution route includes a toll gate at which exact change is required. An example of a warning message produced in accordance with this embodiment is shown in FIG. 9.

Figure 9:
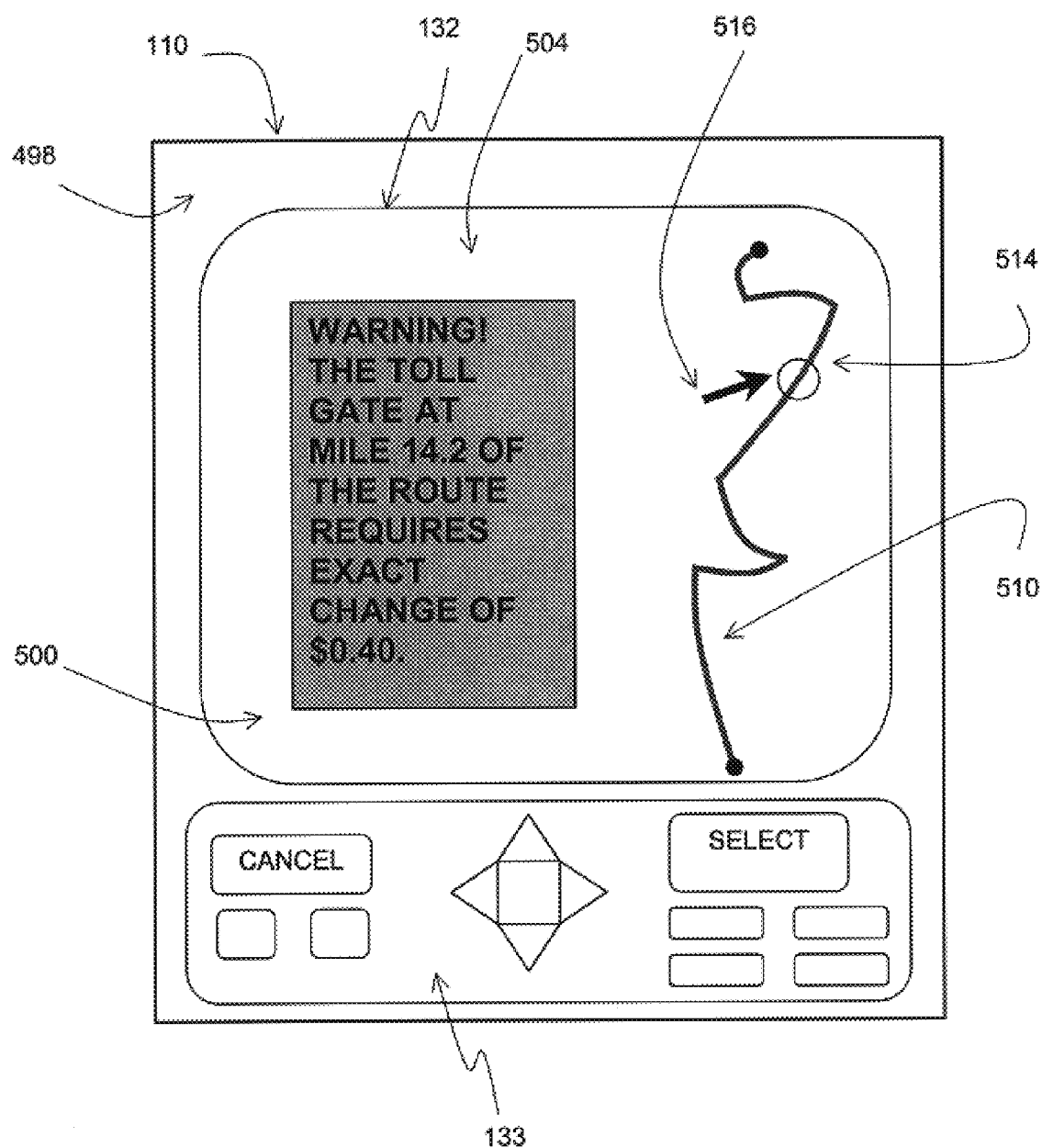
FIG. 9 is an illustration of the navigation system of FIG. 1 showing an image on the display screen relating to an exact change warning message.

Referring to FIG. 9, there is shown a front panel 498 of the navigation system 110. In this embodiment, part or all of the navigation system 110 may be mounted on or in the dashboard of the vehicle in which the navigation system is installed. Accordingly, the front panel 498 of the navigation system is accessible to the end user and observable by the end user.

Located on the front panel of the navigation system 110 are the display panel 132 and input panel 133 of the user interface 131. Portrayed on the display panel 132 is an image 500. In this embodiment, the image 500 includes a warning message 504. The warning message 504 includes text that indicates the presence of a toll gate that requires exact change located along the solution route calculated by the route calculation function 142. In this embodiment, the display panel 132 also shows an image 510 of the calculated solution route. The image 510 shows the general geometry of the calculated route to scale. In this embodiment, an indication 514 is depicted along the image 510 of the solution route. In this embodiment, the indication 514 is a circle that encompasses a portion of the image 510 of the solution route. The indication 514 is depicted at the approximate location along the image of the solution route at which the toll gate at which exact change is required is located. An arrow 516 may also be depicted pointing to the indication 514.

In the embodiment shown in FIG. 9, the warning message 504 also indicates the approximate location along the solution route at which the toll gate at which exact change is required is located. The location along the solution route at which the exact change toll gate is located can be determined by the toll query function 151 by examination of the data in the output 400 of the route calculation function 142.

As mentioned above, in some navigation systems, data may be available that indicate the amount of the toll required at some or all toll gates in a geographic area. If such data are available to the navigation system 110, the warning message 504 provided by the navigation system to the end user may also indicate the amount required at the toll gate at which exact change is required.

According to one embodiment, if the solution route calculated by the navigation system includes more than one toll gate at which exact change is required, the warning message provided by the navigation system to the end user may indicate that there is more than one toll gate that requires exact change in the solution route. The navigation system may list or otherwise indicate all the toll gates at which exact change is required along the solution route. If data are available to the navigation system about toll amounts, the warning message provided by the navigation system to the end user also may also indicate the amount required at each of the toll gates at which exact change is required.

Figure 10:
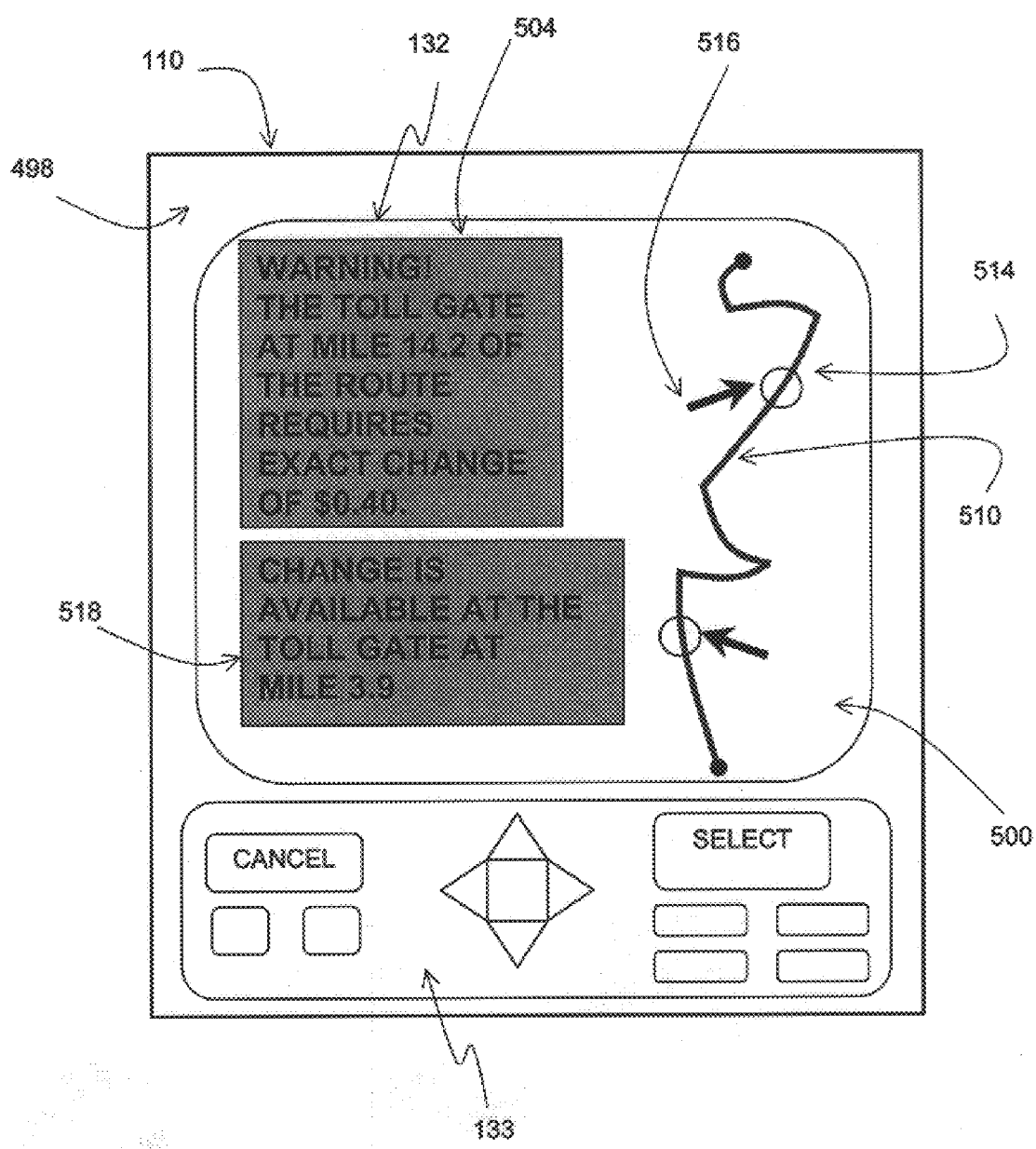
FIG. 10 is an illustration of the navigation system of FIG. 1 showing an image on the display screen including an exact change warning message and a message about the availability of change at another toll gate.

According to another optional feature of this embodiment, if the toll gate at which exact change is required is located on a portion of the solution route that follows a manned toll gate, the navigation system may provide an advisory warning to the driver advising the driver to be sure to obtain the necessary change at the manned toll gate. FIG. 10 shows the display panel 132 of the navigation system including an advisory warning 518 of this type.

According to one embodiment, the warning message about exact change is provided by the navigation system immediately after the route has been calculated. According to this embodiment, the warning message about exact change may be provided by the navigation system before the end user has traveled far along the solution route. In one embodiment, the warning message about exact change is provided before detailed route guidance is provided by the navigation system for following the solution route.

According to an optional feature of this embodiment, after the navigation system 110 has provided the end user with a warning message that exact change is required along the solution route, programming in the navigation system may request the end user to indicate whether an alternative solution route should be calculated that does not include any toll gates at which exact change is required. FIG. 11 shows the display panel 132 of the navigation system including a request 520 of this type. If the end user indicates affirmatively (using an appropriate key on the input panel 133, for example), the navigation system 110 proceeds to calculate a new solution route. The navigation system calculates an alternative route that avoids any toll gate at which exact change is required. When the new solution route is calculated to avoid any toll gate at which exact change is required, any segment that includes a toll gate at which exact change is required is avoided. Alternatively, the navigation system can calculate an alternative route that includes a manned toll gate prior to any toll gate at which exact change is required.

Another alternative feature provided by this embodiment relates to electronic toll collection. This alternative feature is described in connection with FIG. 12. Some jurisdictions or administrative areas provide electronic toll collection systems. Various kinds of electronic toll collection systems are available. According to some systems, an electronic transmitter in the vehicle communicates with a receiver located at the toll gate as the vehicle passes through the toll gate. A toll is automatically paid as the vehicle passes. According to this embodiment, the navigation system calculates a solution route, as described above, and a function determines whether the solution route includes a toll gate at which exact change is required. If the toll gate at which exact change is required supports electronic toll payment, the navigation system presents the end user with an image 528 on the display panel 132. In one embodiment, the image 528 includes a warning message about the presence of a toll gate at which exact change is required located along the solution route. The warning message in the image 528 may also advise the end user that the toll gate supports payment by electronic toll collection. Thus, if the end user has an electronic toll payment device, he/she would be able to use the electronic toll payment device at the toll gate at which exact change is required. If the toll gate at which exact change is required does not support electronic toll payment, the image 528 may include an appropriate warning message so indicating.

{In an alternative embodiment, instead of a warning message, the image 528 provided by the navigation system may be a symbol or icon, or a combination of a symbol or icon with a warning message.)

Some navigation systems provide a route preview function (150 in FIG. 2). The route preview function provides the end user with an outline or highlights of the calculated route. If the navigation system provides a route preview function, the warning about exact change requirements may be provided as part of the route preview.

According to an optional feature of this embodiment, the exact change warning feature may be configurable. Some end users may not want to be warned about exact change requirements. For example, some end users may always have ample amounts of change and therefore may desire not to be provided with warnings about exact change requirements. If an end user does not want to be warned about exact change requirements, the navigation system may be configured to omit providing such warnings. The navigation system may include a setup program or menu through which the end user may configure the navigation system to omit providing exact change warnings. Some navigation systems may include a feature that allows each driver of the vehicle in which the navigation system is installed to configure certain features so that the navigation system is personalized for each separate driver. If the navigation system can be configured for different drivers, then each driver may choose whether to have exact change warnings.

According to another optional feature of this embodiment, after the navigation system has provided the end user with an initial warning about any exact change requirements along the solution route, the navigation system may provide subsequent warnings to the end user. These subsequent warnings may be provided at intervals while the end user is driving along the calculated route. These subsequent warnings may be provided as part of the route guidance function 144. The intervals may be based upon time (e.g., every 5 minutes) or distance (e.g., every 5 miles). A subsequent warning may also be provided as the vehicle approaches a manned toll gate along the solution route at which change may be obtained for the later toll gate at which exact change is required. A final warning may also be provided as the vehicle approaches the toll gate at which exact change is required. When the final warning is provided, the navigation system may accompany the final warning with a request to the end user to indicate whether an alternative route should be calculated that avoids the toll gate at which exact change is required. If the end user indicates affirmatively to the request accompanying the final warning, the navigation system calculates an alternative route that avoids the toll gate at which exact change is required. The alternative route calculated by the navigation system avoids any toll gate at which exact change is required or alternatively, the navigation system calculates an alternative route that includes a manned toll gate prior to any toll gate at which exact change is required.

B. Second Embodiment

According to a second embodiment, the end user uses the navigation system to calculate a route, as described above. After the navigation system has calculated a solution route for the end user, a function in the navigation system software 118 determines whether any portion of the solution route includes a toll gate at which exact change is required. According to this embodiment, the function transmits a wireless message from the vehicle to a service provider. Any suitable form of data transmission may be used, such as cellular, PCS, satellite, radio, etc. The message transmitted from the vehicle to the service provider includes data that indicate the solution route calculated by the in-vehicle navigation system. The data may include the entire list of data entities that represent road segments in the solution route, or alternatively, the data may include an outline or other form of compressed representation by which the service provider can be informed of the solution route. After receiving the solution route, the service provider determines whether any portion of the solution route includes a toll gate at which exact change is required. The service provider queries a database associated with the service provider that includes up-to-date information about tolls, etc. After the service provider determines whether the solution route includes any toll gates at which exact change are required, a message is transmitted from the service provider to the navigation system in the vehicle. The message indicates whether the solution route includes one or more toll gates at which exact change is required. The navigation system then provides a warning message to the end user. The warning message provided by this embodiment may be similar or identical to the warning messages described above in connection with the previous embodiment. All the other features and functions described above in connection with the previous embodiment may also be provided with this embodiment. Messages may be transmitted between the vehicle and the service provider as needed.

An advantage of this embodiment is that the information about tolls can be maintained in a central location. This may facilitate the updating of the information about tolls more frequently.

This alternative embodiment, in which a message is transmitted to a central database, may be used when the in-vehicle navigation system does not have data about toll gates available locally (i.e., in the vehicle). This alternative embodiment in which a message is transmitted to a central database may also used when the in-vehicle navigation system has data about toll gates available locally, but it is desired to check with the service provider for more up-to-date information.

C. Third Embodiment

According to a third embodiment, the end user may query the navigation system installed in the vehicle which the end user is driving about whether a particular road segment includes a toll gate at which exact change is required. This may occur under various circumstances. For example, while driving along a tollway, a driver may wish to exit from the tollway at a particular exit ramp ahead but is unaware whether the exit ramp has a toll gate at which exact change is required. In this example, the driver may not be following a route calculated by the navigation system (in which case the navigation system would have already provided a warning about the upcoming toll gate). For example, the driver may not have requested the navigation system to calculate a route. Alternatively, the driver may be considering a departure from a route calculated by the navigation system. Alternatively, the navigation system may have been configured to omit warnings about toll gates at which exact change is required, as described above.

Regardless of the reason, the end user can query the navigation system about whether a particular road segment includes a toll gate at which exact change is required. The navigation system provides a means by which the query from the driver can be received. This may include appropriate menus and programming in the user interface. The menus and programming allow the end user to identify a particular portion of a road and to inquire whether a toll gate at which exact change is required is located along the identified portion of the road. When the query is received, the navigation system accesses the data in the geographic database relating to the identified road portion. The data relating to the identified road portion is examined for an indication whether a toll gate at which exact change is required is located along the identified road portion. If the identified road portion includes a toll gate at which exact change is required, the navigation system provides a warning to the end user. The warning provided by the navigation system may be accompanied by an indication of the amount of exact change required at the toll gate (if such information is available). The warning provided by the navigation system may be accompanied by a request to indicate whether an alternative route should be calculated that avoids the toll gate at which exact change is required. In this embodiment, if the identified road portion does not include a toll gate at which exact change is required, the navigation system provides an indication to the end user that the identified road portion does not include a toll gate at which exact change is required.

According to an alternative method of operation for this embodiment, when the end user queries the navigation system about whether a portion of a road includes a toll gate at which exact change is required, the navigation system transmits a wireless message to a service provider in order to obtain up-to-date information about the presence of any toll gate on the identified route. This message may be transmitted as described above in connection with the second embodiment. The message to the service provider identifies the road portion. The service provider checks a central database, formulates an answer and transmits the information to the in-vehicle navigation system. Upon receiving the information from the service provider, the in-vehicle navigation system provides the information to the end user. This alternative embodiment in which a message is transmitted to a central database may be used when the in-vehicle navigation system does not have data about toll gates available locally (i.e., in the vehicle). This alternative embodiment in which a message is transmitted to a central database may also be used when the in-vehicle navigation system has data about toll gates available locally, but it is desired to check with the service provider for more up-to-date information.

D. Fourth Embodiment

According to a fourth embodiment, when requesting the navigation system to calculate a solution route to a desired destination, the end user may specify that toll gates at which exact change is required be avoided. The end user may specify this preference when indicating a desired destination. When the navigation system proceeds to calculate a solution route, it avoids including any road segment that includes a toll gate requiring exact change. According to an optional feature of this embodiment, the navigation system may be configurable by the end user to automatically avoid toll gates at which exact change is required. If the navigation system is configured in this manner, solution routes will be calculated avoiding toll gates at which exact change is required by default.

According to an optional feature of this embodiment, the end user may be able to specify that toll gates that require exact change and that do not accept electronic toll payment be avoided. The end user may specify both these preferences when indicating a desired destination. When the navigation system proceeds to calculate a solution route, it avoids including any road segment that includes a toll gate requiring exact change and that does not accept electronic payment.

E. Additional Alternative Embodiments

In addition to in-vehicle navigation systems, the features described above can be provided on other types of computing platforms that provide navigation-related features. For example, navigation application programs may be provided on personal computers, including desktop computers and portable computers. Computer-based navigation application programs may also be provided on networks, including wireless networks and the Internet. Computer-based navigation application programs may also be included on hand-held computer devices, such as personal digital assistants, telephones, pagers, and so on. In addition, computer-based navigation application programs may be included on special purpose electronic devices, such as personal navigation systems.

It is intended that the foregoing detailed description be regarded as illustrative rather than limiting and that it is understood that the following claims including all equivalents are intended to define the scope of the invention.

We claim:

1. A method of operation for a navigation system comprising:

accepting a request from a vehicle driver to calculate a solution route to a destination indicated by the vehicle driver;

accessing a geographic database that contains information about whether exact change is required at toll gates; and advising the vehicle driver that exact change is required at a toll gate located along the solution route.

2. The method of claim 1 further comprising the steps of:

in conjunction with the step of advising the vehicle driver that exact change is required at a toll gate located along the solution route, offering to calculate an alternative route.

3. The method of claim 1 further comprising the steps of:

after advising the operator about said exact change, accepting a request from the vehicle driver to calculate an alternative route; and calculating a new solution route that does not include driving to a toll gate at which exact change is required.

4. The method of claim 1 wherein said navigation system is an in-vehicle system.

5. The method of claim 1 further comprising the steps of:

transmitting a first message from the vehicle to a server, wherein the message indicates that said driver has been provided with driving instructions that direct the driver to drive to a toll gate;

on a database associated with said server, querying whether said toll gate requires exact change; and transmitting a second message from said server to said vehicle indicating whether said toll gate requires exact change.

6. The method of claim 1 further comprising the step of:

in conjunction with the step of advising the vehicle driver that exact change is required at said toll gate, advising the vehicle driver that change can be obtained at a toll gate located before the toll gate at which exact change is required.

7. The method of claim 1 further comprising:

providing the vehicle driver with driving instructions to follow the solution route.

8. The method of claim 1 wherein said step of advising the vehicle driver is provided with a visual warning message on a display panel of the navigation system.

9. A method of operation for a navigation system installed in a vehicle comprising the steps of:

receiving an inquiry through a user interface of said navigation system from a driver of said vehicle, wherein said inquiry asks whether a specified portion of a road includes a toll gate that requires exact change;

accessing a geographic database that contains information about whether exact change is required at toll gates along said road; and in response to said inquiry, advising said driver whether said specified portion of a road includes a toll gate that requires exact change.

10. The method of claim 9 wherein said navigation system is an in-vehicle system.

11. The method of claim 9 wherein said step of advising the vehicle driver is provided with a visual warning message on a display panel of the navigation system.

12. A method of operation for a navigation system comprising:

calculating a route to a destination using a geographic database;

using data contained in the geographic database to determine whether exact change is required along any roads in the route; and advising an operator of said navigation system that exact change is required at a toll gate along the route.

13. The method of claim 12 further comprising the step of:

after advising the operator about said exact change, accepting a request from said driver to calculate an alternative route that does not require exact change at a toll gate along the alternative route.

14. The method of claim 12 wherein said step of advising the operator is provided with a visual warning message on a display panel of the navigation system.

15. A method of operating a navigation system to calculate a route, the method comprising:

accepting input from an operator of said navigation system that indicates that a calculated route should not include toll gates at which exact change is required;

accepting input from the operator of said navigation system including at least a desired destination; and if said input indicates that a calculated route should not include any toll gates at which exact change is required, accessing a geographic database that contains information about whether exact change is required at tollgates, and calculating a route to said desired destination excluding any road that includes a toll gate at which exact change is required.

16. The method of claim 15 wherein said navigation system is an in-vehicle system.

17. A method of operation for a navigation for calculating routes, the method comprising:

accepting a request from a user of the navigation system to avoid toll gates at which exact change is required;

accepting a request from the user to calculate a route to a specified destination;

accessing a geographic database to determine characteristics of roads, including whether a toll gate at which exact change is required is located along a road along said route;

calculating a solution route to the specified destination based upon the characteristics of roads, wherein said solution route does not include a road along which is located a toll gate at which exact change is required; and indicating the solution route to the user.

18. The method of claim 17 wherein said step of accepting a request from a user of the navigation system to avoid toll gates at which exact change is required is specified as a default for the navigation system.

19. The method of claim 17 wherein said navigation system is an in-vehicle system.

20. A method of operation for a navigation system comprising:

accepting a request from a vehicle driver to calculate a solution route to a destination indicated by the vehicle driver;

accessing a geographic database to determine characteristics of roads, including whether a toll gate at which exact change is required is located along said route;

advising the vehicle driver that exact change is required at a toll gate located along the solution route;

after advising the operator about said exact change, accepting a request from the vehicle driver to calculate an alternative route; and calculating a new solution route that does not include driving to the toll gate at which exact change is required.

21. The method of claim 20 further comprising the steps of:

in conjunction with the step of advising the vehicle driver that exact change is required at a toll gate located along the solution route, offering to calculate an alternative route.

22. The method of claim 20 wherein said navigation system is an in-vehicle system.

23. The method of claim 20 further comprising the steps of:

transmitting a first message from the vehicle to a server, wherein the message indicates that said driver has been provided with driving instructions that direct the driver to drive to a toll gate;

on a database associated with said server, querying whether said toll gate requires exact change; and transmitting a second message from said server to said vehicle indicating whether said toll gate requires exact change.

24. The method of claim 20 further comprising the step of:

in conjunction with the step of advising the vehicle driver that exact change is required at said toll gate, advising the vehicle driver that change can be obtained at a toll gate located before the toll gate at which exact change is required.

25. The method of claim 20 further comprising:

providing the vehicle driver with driving instructions to follow the solution route.

26. The method of claim 2 wherein said step of advising the vehicle driver is provided with a visual warning message on a display panel of the navigation system.

* * * * *